Oct. 18, 1938.　　　　C. D. BROWN　　　　2,133,729
THREAD CUTTING TEMPLE
Filed June 3, 1938
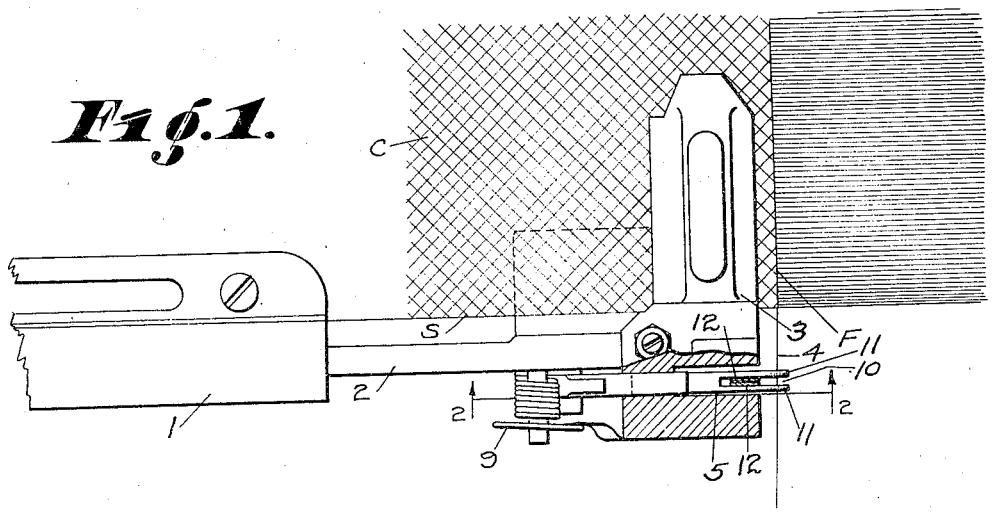
Fig.1.
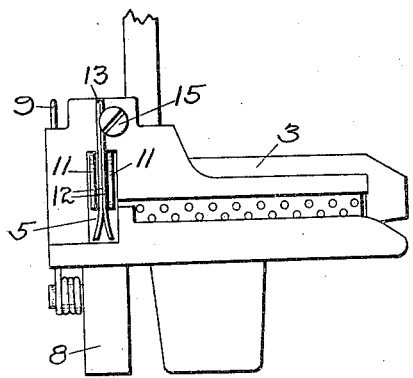
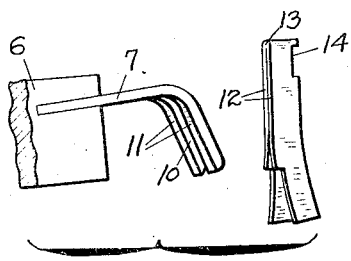
Fig.2.　　　　Fig.3.
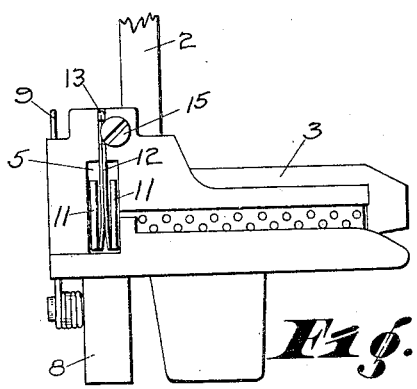
Fig.4.　　　Fig.5.
INVENTOR.
CARL D. BROWN.
BY Claude F. Snider
ATTORNEY.

Patented Oct. 18, 1938

2,133,729

UNITED STATES PATENT OFFICE 2,133,729

THREAD CUTTING TEMPLE

Carl D. Brown, Hopedale, Mass., assignor to Draper Corporation, Hopedale, Mass., a corporation of Maine Application June 3, 1938, Serial No. 211,569

4 Claims. (Cl. 139—303)

The present invention pertains to thread cutting temples for looms and more particularly to the cutting instrumentalities of such temples.

Temples of the type to which my invention applies are mounted on a loom adjacent the cloth selvage and have a temple head which engages the cloth and holds it taut. Such temples, at one side of the loom, are also provided with cutting instrumentalities for cutting or trimming ends of filling thread which project from the cloth selvage. As previously constructed, such cutting instrumentalities have usually consisted of a fixed, or ledger blade, and a movable cutting blade one side face of which cooperated with the ledger blade, although in some prior constructions the movable blade is bifurcated to straddle the ledger blade, as is well known in the art.

The aforementioned prior constructions wherein one side face of a movable cutter blade cooperates with a ledger blade are subject to the disadvantage that, having only one cutting edge on each blade, operation of the device depends upon both said edges being sharp and in proper operative relation to each other. The prior construction including a bifurcated movable blade is objectionable in that a slight bending or displacement of either of the legs of the blade will result in the movable blade being too tight or too loose on the ledger blade, which in either case results in a failure of the device to operate properly.

A principal object of the present invention is to provide a thread cutting temple having a temple head as aforesaid, a bifurcated ledger blade, and a bifurcated movable cutting blade straddling the ledger blade, wherein the legs of such ledger blade are biased away from each other into yielding contact with the respective legs of the movable blade, whereby the ledger blade will occupy proper cutting relation to both legs of the movable blade irrespective of moderate bending or displacement of the latter.

The foregoing and other objects of the invention are accomplished in the construction illustrated on the accompanying drawing, of which:

Fig. 1 is a plan view, partly in section, showing the preferred embodiment of my improved thread cutting temple in operative relation to the cloth;

Fig. 2 is a view in cross-section taken approximately on line 2—2 of Fig. 1;

Fig. 3 is a view in elevation of the rear face of the temple shown on Fig. 1, the movable cutter blade being in its rearward or idle position;

Fig. 4 is a view similar to Fig. 3 but showing the movable cutter blade in a different position; and Fig. 5 is a detail view, in perspective, of the cutting blades of the aforesaid temple.

The temple shown on the drawing includes a housing 1 which is adapted to be attached to a loom frame (not shown), a bar 2 which is slidably mounted in the housing 1, and a laterally extending head 3 carried by the rearward end of said bar. The temple is so located that the bar 2 extends forwardly and rearwardly of the loom, adjacent and substantially parallel to the selvage S of the cloth C and the head 3 engages the cloth just forwardly from the fell F thereof. The temple as thus far described is not new, and may be of any suitable usual construction.

The normal operation of an automatic loom results in the periodic formation of lengths or ends 4 of filling thread which project from the selvage S of the cloth, as is well known in the art. It is to cut or trim the ends 4 adjacent the cloth selvage that the thread cutting means are provided. In common with prior constructions, my improved thread cutting devices may be mounted in a guideway 5 which is located in a vertical plane and which extends through the temple head from front to rear thereof.

The thread cutting devices of the present invention include a movable cutter blade and a ledger blade which is of novel construction and which cooperates with the movable blade in a novel manner. In the particular embodiment shown on the drawing, the movable cutter blade includes a body portion 6 having a cutting tip 7 at its rearward end and a depending heel 8 at its forward end. This blade is mounted to rock and slide in the guideway 5 and normally occupies the position shown by Fig. 2, wherein the tip 7 is up and projects rearwardly out of the guideway. The heel 8 is adapted to be struck by the usual loom lay (not shown), whereupon the blade rocks, to lower the tip 7 behind the filling end 4, and then slides forwardly. Return movement of the cutter blade is effected by a suitable spring 9.

The movable cutter blade is bifurcated, and to this end the cutting tip 7 may consist of a separate flat steel strip which is slotted at 10 to provide two rearwardly and downwardly extending legs 11. The ledger blade of the present invention is also bifurcated, in that it includes two steel legs such as those shown at 12, 12 on the drawing.

In the particular embodiment shown, the legs 12 are integrally joined at their upper ends 13, the ledger blade being formed from a single flat strip of steel. One end of the ledger blade is fixed to the temple head. To this end the upper portion of the legs 12 may be notched as at 14 to receive the head of a screw 15 whereby the ledger blade is fixed in a vertical position at the rearward end of the guideway 5. The upper end portions of the legs 12 are in face-to-face contact with each other, whereby such legs mutually reinforce and strengthen each other against lateral bending. The legs 11 of the movable cutter blade straddle the ledger blade and project out of the guideway 5. The lower ends of the legs 12 of the ledger blade are biased away from each other into yielding engagement with the respective legs 11 of the movable blade, as shown on the drawing.

The rear vertical edges of the legs 12 have sharp square corners, to provide cutting edges. The legs 11 are similarly provided with cutting edges. The bias of the legs 12 is such that the legs contact the legs 11, with the respective cutting edges in contact, when the movable cutter blade is in its rearward or idle position as shown by Figs. 1, 2 and 3. When the heel 8 is struck by the lay the movable blade rocks, to lower the tip 7, and then slides forwardly, which is toward the left on Figs. 1 and 2. Such movements of the movable cutter blade will result in the spaced lower ends of the legs 12 being bent toward each other. As shown by Fig. 4, the construction is preferably such that when the movable cutter blade is in its extreme forward position, the legs 12 are still spaced apart at their extreme lower ends.

In the construction above described, the respective cutting edges of the legs 11 and 12 are always in cutting contact, because the legs 12 flex or bend as required to maintain such contact. The above mentioned mutual reinforcement of the legs of the ledger blade by their contacting relation permits such blade to be made sufficiently thin that it will withstand the continual flexing to which it is subjected. The relatively thin legs 12 will exert only a light pressure on the legs 11, which is sufficient to insure proper cutting of the filling thread but is not sufficient to cause undue wear of the cutting edges. I have thus provided a satisfactory thread cutting temple having double cutting edges, which will not be rendered inoperative by slight bending or displacement of the movable cutting blade.

Having fully disclosed the preferred embodiment of my invention, I claim:

1. A thread cutting temple comprising a temple head having a bifurcated ledger blade and a movable cutter blade, said cutter blade having a bifurcated cutting tip straddling said ledger blade, the legs of said ledger blade being biased away from each other into contact with the respective legs of said cutting tip.

2. A thread cutting temple comprising a temple head having a guideway therein, a bifurcated ledger blade fixed to said head at one end of said guideway, and a movable cutter blade mounted in said guideway and having a bifurcated cutting tip straddling said ledger blade, the legs of said ledger blade being biased away from each other into yielding engagement with the respective legs of said cutting tip.

3. A thread cutting temple comprising a temple head having a guideway therein, a ledger blade comprising two flat steel legs each fixed at one end to said head, and a movable cutter blade mounted in said guideway and having a bifurcated cutting tip straddling said ledger blade and projecting out of said guideway, said fixed ends of said legs being in contact with each other and the opposite ends thereof being biased away from each other into yielding engagement with the respective legs of said cutting tip.

4. A thread cutting temple comprising a temple head having a guideway therein, a ledger blade comprising two flat steel legs located at one end of said guideway and having their upper ends fixed to said head, and a rocking and sliding cutter blade mounted in said guideway, said cutter blade having a bifurcated cutting tip straddling said ledger blade and projecting out of said guideway, the upper portions of said legs being in mutually reinforcing contact with each other and the lower ends thereof being biased away from each other into yielding engagement with the respective legs of said cutting tip.

CARL D. BROWN.